US012702087B2

(12) United States Patent
Claes et al.

(10) Patent No.: US 12,702,087 B2
(45) Date of Patent: Aug. 11, 2026

(54) COMBINE HARVESTER WITH SHREDDER

(71) Applicant: CLAAS Selbstfahrende Erntemaschinen GmbH, Harsewinkel (DE)

(72) Inventors: Ulrich Claes, Halle/Westfalen (DE); Manuel Elpmann, Salzkotten (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 389 days.

(21) Appl. No.: 18/369,925

(22) Filed: Sep. 19, 2023

(65) Prior Publication Data

US 2024/0090375 A1 Mar. 21, 2024

(30) Foreign Application Priority Data

Sep. 19, 2022 (DE) ..................... 10 2022 123 913.6

(51) Int. Cl.
*A01D 41/12* (2006.01)
*A01D 41/127* (2006.01)

(52) U.S. Cl.
CPC ....... *A01D 41/1243* (2013.01); *A01D 41/127* (2013.01)

(58) Field of Classification Search
CPC .... A01D 41/1243; A01D 41/127; A01F 12/40
See application file for complete search history.

(56) References Cited

U.S. PATENT DOCUMENTS 4,913,679 A * 4/1990 Bender .................. A01F 12/40 460/99
5,833,533 A * 11/1998 Roberg .................. A01F 12/40 56/504
(Continued)

FOREIGN PATENT DOCUMENTS

DE 3735669 A1 * 5/1989 ......... A01D 41/1243
DE 10130652 A1 1/2003
(Continued)

OTHER PUBLICATIONS

European Search Report for EP Application No. 23186574.2-1105 mailed Mar. 1, 2024.

*Primary Examiner* — Arpad Fabian-Kovacs
(74) *Attorney, Agent, or Firm* — Lempia Summerfield Katz LLC

(57) ABSTRACT

A combine harvester. The combine harvester includes a separating device for separating grain and straw and a shredding device downstream from the separating device for shredding a straw portion discharged from the separating device. The shredding device comprises a chopping rotor which is rotationally driven about an axis oriented transversely to an infeed direction of the portion of straw into the shredding device, and the rotary movement of which generates an air flow directed away from the chopping rotor. The rotary movement is opposite the infeed direction on a part of the circumference of the chopping rotor. Further, the infeed direction of the straw portion into the shredding device is regulated by at least one structure, such as an adjustable crop guide plate, in such a way that the air flow does not counteract the infeed of the straw portion into the shredding device.

20 Claims, 4 Drawing Sheets

(56) References Cited

U.S. PATENT DOCUMENTS

| | | | | |
|---|---|---|---|---|
| 6,547,169 | B1 * | 4/2003 | Matousek | A01D 41/1243 239/653 |
| 6,699,121 | B2 | 3/2004 | Bognar et al. | |
| 6,719,627 | B2 * | 4/2004 | Wolters | A01F 12/40 460/111 |
| 6,863,605 | B2 * | 3/2005 | Gryspeerdt | A01D 41/1243 460/111 |
| 7,063,613 | B2 * | 6/2006 | Weichholdt | A01F 12/40 460/112 |
| 7,485,035 | B1 * | 2/2009 | Yde | A01D 41/1243 460/111 |
| 7,717,779 | B1 * | 5/2010 | Weichholdt | A01D 41/1243 460/112 |
| 7,896,732 | B2 * | 3/2011 | Benes | A01D 41/1243 460/112 |
| 8,231,447 | B2 | 7/2012 | Buehlmeier | |
| 8,585,475 | B2 * | 11/2013 | Isaac | A01F 12/40 460/111 |
| 9,578,803 | B2 * | 2/2017 | Desmet | A01F 12/00 |
| 9,943,031 | B2 * | 4/2018 | Panoushek | A01D 90/10 |
| 10,188,034 | B2 * | 1/2019 | Reinecke | A01F 12/444 |
| 10,306,834 | B2 * | 6/2019 | Ballegeer | A01F 12/40 |
| 10,575,471 | B2 * | 3/2020 | Faulkner | A01F 7/06 |
| 2003/0003974 | A1 | 1/2003 | Niermann et al. | |
| 2004/0176151 | A1 | 9/2004 | Gryspeerdt et al. | |
| 2005/0282602 | A1 * | 12/2005 | Redekop | A01F 12/40 460/112 |
| 2013/0095899 | A1 * | 4/2013 | Knapp | A01D 41/127 460/111 |
| 2014/0171160 | A1 * | 6/2014 | Ricketts | A01D 41/1243 460/1 |
| 2014/0302897 | A1 * | 10/2014 | Isaac | A01D 41/127 460/111 |
| 2018/0070534 | A1 * | 3/2018 | Mayerle | A01D 41/1243 |
| 2018/0084718 | A1 | 3/2018 | Baumgarten et al. | |
| 2018/0343805 | A1 | 12/2018 | Faulkner et al. | |
| 2018/0352748 | A1 * | 12/2018 | Rittershofer | A01F 12/40 |
| 2018/0368319 | A1 * | 12/2018 | Desmet | A01F 17/02 |
| 2019/0104681 | A1 * | 4/2019 | Larson | A01F 12/40 |
| 2020/0236850 | A1 * | 7/2020 | Mayerle | A01D 41/14 |
| 2023/0240184 | A1 * | 8/2023 | Mayerle | A01D 41/1243 460/112 |

FOREIGN PATENT DOCUMENTS

| | | | | |
|---|---|---|---|---|
| DE | 102020112187 | A1 | 11/2021 | |
| EP | 0595382 | A1 * | 5/1994 | A01F 12/40 |
| EP | 2708108 | A1 * | 3/2014 | A01D 41/12 |
| EP | 3409095 | A1 | 12/2018 | |
| EP | 4082324 | A1 * | 11/2022 | A01F 12/40 |

* cited by examiner

COMBINE HARVESTER WITH SHREDDER

CROSS REFERENCE TO RELATED APPLICATION

This application claims priority under 35 U.S.C. § 119 to German Patent Application No. DE 10 2022 123 913.6 filed Sep. 19, 2022, the entire disclosure of which is hereby incorporated by reference herein.

TECHNICAL FIELD

The present invention relates to a combine harvester having a separating device for separating grain and straw, and a shredding device downstream from the separating device for shredding a portion of straw discharged from the separating device. The shredding promotes decomposition of the straw when the straw is spread by the combine harvester onto a field that has just been harvested.

BACKGROUND

This section is intended to introduce various aspects of the art, which may be associated with exemplary embodiments of the present disclosure. This discussion is believed to assist in providing a framework to facilitate a better understanding of particular aspects of the present disclosure. Accordingly, it should be understood that this section should be read in this light, and not necessarily as admissions of prior art.

U.S. Pat. No. 6,699,121, incorporated by reference herein in its entirety, discloses a combine harvester in which a shredding device is fed with a flow of harvested material comprising (or consisting essentially of) short straw and chaff from a cleaning device, and a flow of harvested material comprising (or consisting essentially of) long straw from a grain-straw separating device. The shredding device comprises a chopping rotor, which may be rotationally driven about an axis oriented transversely to an infeed direction of the straw component into the shredding device.

BRIEF DESCRIPTION OF THE DRAWINGS

The present application is further described in the detailed description which follows, in reference to the noted drawings by way of non-limiting examples of exemplary implementation, in which like reference numerals represent similar parts throughout the several views of the drawings, and wherein.

DETAILED DESCRIPTION

Figure 1:
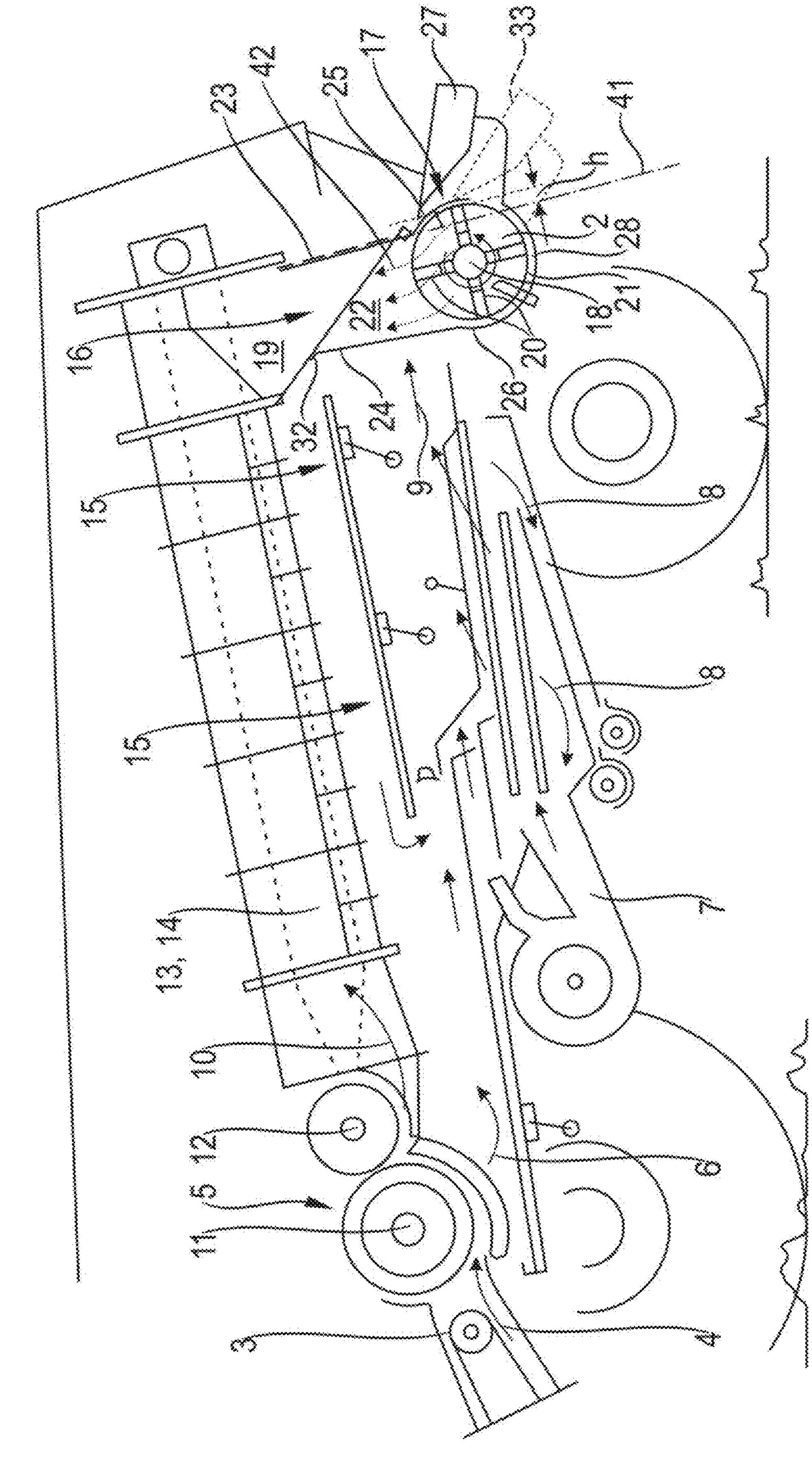
FIG. 1 illustrates a part of a combine harvester in a side view or schematic section.

In a conventional combine harvester, such as discussed in the background, a crop guide plate may be pivotable between a position in which it directs the flow of harvested material comprising (or consisting of) long straw past the shredding device, and a position in which it blocks the path of this flow of harvested material past the shredding device. In this latter position, an outlet of the cleaning device is opposite the crop guide plate, so that the long straw may be carried or guided into the cleaning device by an air stream driven by the rotation of the chopping rotor and impair its effect.

If another guide plate is provided or positioned opposite the crop guide plate to block the path of the long straw into the cleaning device, a problem may arise that parts of the long straw may be held in suspension in a gusset between the crop guide plate and a circumferential section of the chopping rotor, which moves opposite the direction of travel of the straw. So that, straw may collect there until the forming clumps of straw becomes heavy enough to be caught and carried away by the chopping rotor. Each time this happens and the clump is suddenly shredded, the chopping rotor may abruptly slow down. This slowing down may significantly contribute to the operating noise of the combine harvester. In addition, the chopping rotor must quickly reaccelerate so that when the next clump is pulled in, it has enough kinetic energy to push it through. This may necessitate a high drive power for the chopping rotor or, if the drive power is insufficient, may lead to a blockage of the chopping rotor, for the removal of which the operation of the combine must be interrupted.

Thus, in one or some embodiments, a combine harvester with a shredding device is disclosed in which material jams may be avoided and a continuous flow of material may be ensured. Further, the combine harvester with the shredding device may reduce energy consumption and operating noise.

Thus, a combine harvester is disclosed as having a separating device configured to separate grain and straw and a shredding device downstream from the separating device configured to shred a portion of straw discharged by the separating device. The shredding device may comprise a chopping rotor which may be driven in rotation or rotated about an axis oriented transversely to an infeed direction of the portion of straw into the shredding device, and the rotary movement of which generates an air flow directed away from the chopping rotor. Further, the rotary movement may be opposite the infeed direction on a part of the circumference of the chopping rotor, with the infeed direction of the material flow into the secondary shredding device being regulated by at least one mechanical structure in such a way that the air flow does not counteract the infeed of the material flow into the shredding device. Various mechanical structures are contemplated to regulate the infeed direction of the straw portion into the shredding device so that the air flow does not counteract the infeed of the straw portion into the shredding device. As one example, the infeed direction may be regulated by an adjustable crop guide plate that borders a channel running from the separating device to the shredding device on one side.

In one or some embodiments, in a chopping rotor with its axis oriented in the transverse direction of the combine harvester, the direction of rotation may be generally selected such that a lower half of the chopping rotor moves opposite the direction of travel to promote the spreading of the chopped material. Accordingly, a rear half of the chaff rotor moves upward, and to prevent the straw from forming clumps, the crop guide plate may be provided or positioned on the rear side of the channel with respect to the direction of travel of the combine harvester.

In one or some embodiments, the position of the crop guide plate may be regulated or adjusted depending on any one, any combination, or all of: the nature of the chopped material; the rotational speed of the chopping rotor; an operating speed of the separating device; or a mass flow. If, for example, the stalks of the chopped material, either due to dryness or due to the type or variety of the plant material, tend to break up in the separating device into small, light fragments that are well suited to being held in suspension at the entrance to the shredding device, it may be appropriate to very strongly narrow the channel with the crop guide plate. Also, a low mass flow or a high operating speed of the separating device may cause the chopped material to concentrate on a part of the channel cross-section where it is particularly prone to clump formation, unless it is deflected away from this part by the adjustable crop guide plate. In this regard, the position of the crop guide plate may be changed (such as automatically changed) responsive to identifying or detecting any of the conditions listed. Various adjustments of the crop guide plate are contemplated. Merely by way of example, the adjustment may comprise pivoting the crop guide plate about an axis parallel to the axis of the chopping rotor.

In one embodiment, however, a rigidly positioned crop guide plate, which borders a channel running from the separating device to the shredding device on one side (e.g., a rear side with respect to the direction of travel of the combine harvester), may also be effective. This may apply if the channel is bordered on a second side by a further guide plate or another guide plate, which may limit deflection of the chopped material transverse to the adjustable crop guide plate.

In order to effectively reduce the tendency to form clumps, the distance between the crop guide plate and the other guide plate may be permanently smaller than the diameter of the chopping rotor in the case of a rigidly positioned crop guide plate, and at least temporarily smaller than the diameter of the chopping rotor in the case of an adjustable one (such as by at least 20%). A distance that is smaller by more than 50% may not expedient or advisable, since narrowing beyond 50% may not further reduce the risk of clump formation; however, there is a possibility of clogging if the channel is too narrow. Thus, in one or some embodiments, an upper limit of 30% may be advisable.

In one or some embodiments, the crop guide plate may extend along at least a part of the length of the chopping rotor, such as along the entire length of the chopping rotor to act along its entire length.

In order to sufficiently reduce the upward velocity component of the airflow that supports the hovering of the chopped material above the rotor, the rotor housing plate may have an inclination of 30° to 70°, such as 40° to 60°, from the vertical at its edge adjacent to the adjustable crop guide plate.

Referring to the figures, FIG. 1 shows a schematically portrayed combine harvester 1. See also US Patent Application Publication No. 2018/0084718 A1, incorporated by reference herein in its entirety. An attachment (not shown here) may be mounted on a front side of the combine harvester 1 and may feed a stream 4 of raw harvested material to a tangential threshing unit 5 via an inclined conveyor 3. In a manner known per se and therefore not explained in more detail, a first intermediate flow of harvested material 6 is separated in the tangential threshing unit 5 and is segregated in the area of a cleaning device 7 of any design into a flow of harvested material consisting essentially of grains, hereinafter referred to as the grain portion 8, and a flow of harvested material comprising (or consisting essentially of) short straw and chaff, hereinafter referred to simply as the chaff portion 9. See U.S. Pat. No. 8,231,447, incorporated by reference herein in its entirety.

At least one additional intermediate flow of harvested material 10 may be fed from the one or more threshing elements 11, 12 to a grain/straw separating device 14 designed as an axial flow rotor 13 in one or more embodiments. In this, the flow of harvested material 10 may be divided into a partial stream 15 of grain, short straw and chaff, which may exit along the axial flow rotor 13 through jacket openings of the same, and may be combined in the cleaning device 7 with the first intermediate flow of harvested material 6, and a second flow of harvested material which comprises (or consists essentially of) long-stemmed straw and is therefore referred to hereinafter as straw portion 16. An outlet area 19, at which the straw portion 16 exits the axial flow rotor 13, is located at a rear end thereof.

A shredding device 17 for chopping the straw portion 16 may be arranged or positioned below the outlet area 19. The shredding device 17 may comprise a chopping rotor 2, which may be rotationally driven in a counterclockwise direction about an axis 18 aligned transversely to the direction of travel FR of the combine harvester 1 in the perspective of FIG. 1, and a housing with housing sections 25, 26 which, separated from one another by infeed and outlet openings, may extend on a substantially cylindrical surface around the chopping rotor 2. The chopping rotor 2 may comprise a central shaft to which a plurality of chopping blades 20 are each pivotally articulated about an axis parallel to the axis 18. When the chopping blades 20 extend radially from the axis 18 under the influence of centrifugal force, their outer tips describe or define a circle 21 around the axis 18. The rotation of the chopping rotor 2 may drive radially outwardly directed air flows, wherein an airflow 42 through the infeed opening of the shredding device 17 may be opposite the direction of flow of the straw portion 16 and may impede the advance of the straw portion 16 into the shredding device 17.

In one or some embodiments, a channel 22 may extend substantially vertically between the outlet area 19 and the infeed opening of the shredding device 17, so that the straw portion 16 moves towards the shredding device 17 via the channel 22 driven by its own weight. The width of the channel 22 in the transverse direction of the combine harvester 1 may correspond to the length of the chopping rotor 2 in the direction of the axis 18. In order to uniformly apply the straw portion 16 to the channel 22 across its width, the separating device 14 may comprise a plurality of adjacent axial flow rotors 13, such as two.

In the direction of travel of the combine harvester 1, the channel 22 may be bordered by a rear guide plate 23 and a front guide plate 24.

In one or some embodiments, the rear guide plate 23 may extend downwardly between or from a rear edge of the outlet area 19 in the separating device 14, and is connected at its lower edge to the housing section 25 which extends concentrically with the axis 18 around the chopping rotor 2. An imaginary line 41 that extends through the upper and lower edges of the rear guide plate 23 and beyond its lower edge may divide the circle 21 into a front segment that contains the axis 18, and a rear segment whose segment height h corresponds to at least 10%, such as at least 15%, of the radius of the circle 21. This may prevent the circle 21 and the rear guide plate 23 from forming a narrow, acute-angled gusset in which a strong upward air flow driven by the rotating chopping blades 20 promotes or results in the floating and clumping of straw particles. Instead, the rear guide plate 23 may be in the slipstream of the airflow 42 so that close to the rear guide plate 23, even light particles of the straw portion 16 may advance to and be captured by the chopping rotor 2.

In one or some embodiments, the front guide plate 24 extends downwardly from a front edge of the outlet area 19 on the separating device 14, and merges at its lower edge with the housing section 26, which extends concentrically to the axis 18 around a front lower quadrant of the chopping rotor 2. Opposing blades 40 projecting radially inwardly from housing section 26 cooperate with chopping blades 20 to chop the straw portion 16 fed through channel 22 and feed it to a wide spreading device 27. The wide spreading device 27 may be configured to spread the chopped straw portion 16 (e.g., the chopped material) in the direction of the width behind the combine (e.g., in the width direction at the rear of the combine). In one or some embodiments, the wide spreading device 27 may have any familiar design and is therefore not described here.

Straw particles that reach the shredding device first behind the axle 18 near rear guide plate 23 are propelled forward and (to a lesser extent) upward against front guide plate 24 by the chopping blades 20, slide down the latter, and are then continuously captured by the chopping blades 20 and pulled through the shredding device 17.

Figure 2:
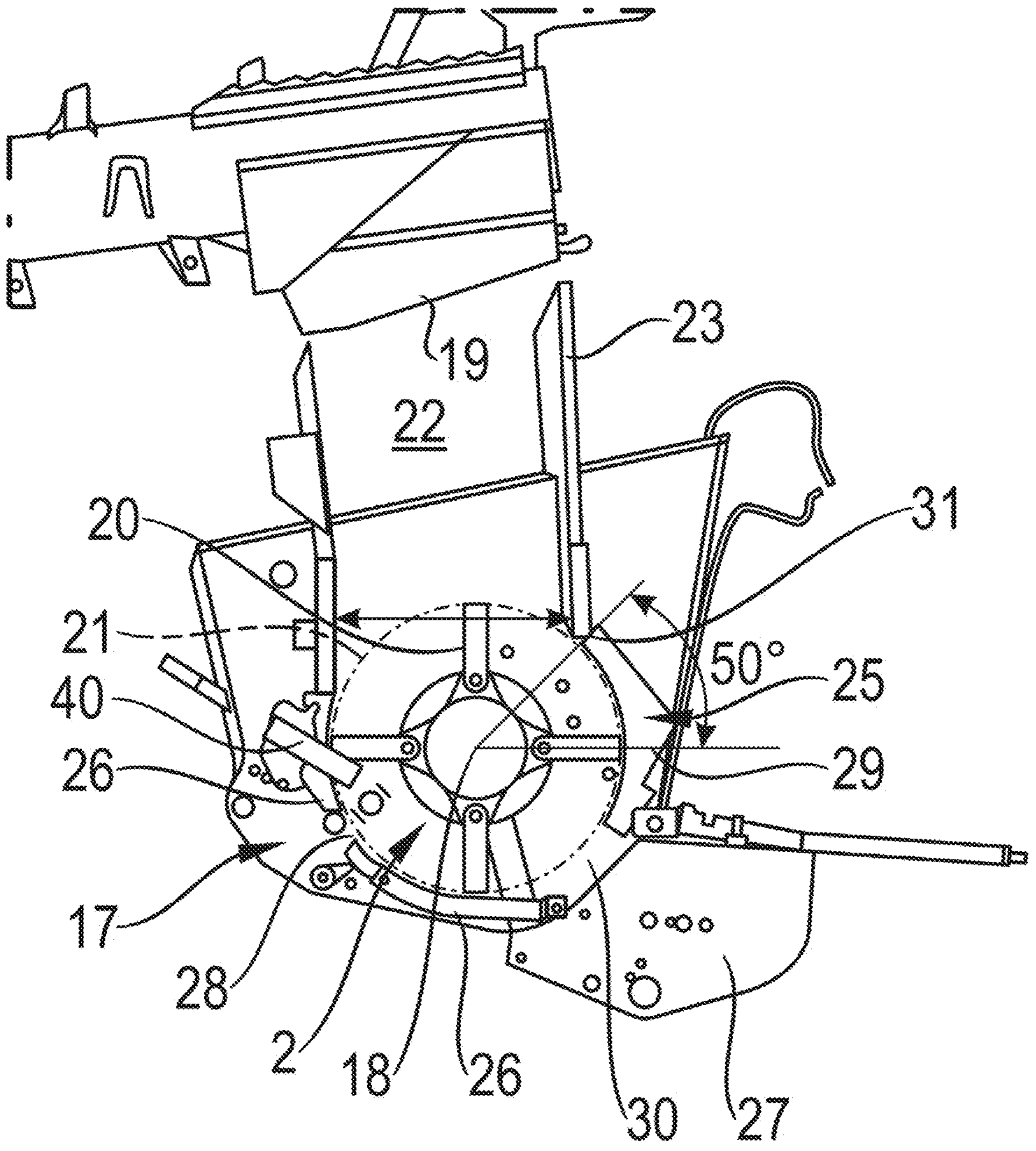
FIG. 2 illustrates a shredding device of the combine harvester in cross-section.

FIG. 2 shows an enlarged cross-section through the shredding device 17. The housing section 25 approximately forms an arc of a circle extending downward from a vertical section 29 to the upper edge of an exit 30 leading to the wide spreading device 27 and upward over an arc of 50° to an upper edge 31 from which the rear guide plate 23 extends. A tangent line contacting the housing section 25 at its upper edge 31 and the rear guide plate 23 span an angle facing the channel 22 and the chopping rotor 2, which may cause the rear guide plate 23 to be in the slipstream of the airflow 42 emanating from the chopping rotor 2. Straw particles that slide downward guided on the rear guide plate 23 therefore may reach the shredding device 17 at a nonvanishing speed (e.g., a speed that decreases though is still non-zero) radial to the axis 18, so that they enter the circle 21 and are captured by the chopping blades 20.

The housing section 26 may be formed by a plurality of segments following one another in the circumferential direction of the circle 21. One of these segments 28 may be pivoted in a controlled manner against the chopping rotor 2 in order to control the width of the gap between the chopping blades 20 and the housing section or the friction between the relevant segment and the straw, and thereby influence the efficiency of the chopping process.

In one or some embodiments, the rear guide plate 23 is hinged to the housing section 26 at the upper edge 31 and, when the chopping rotor 2 is at a standstill, may be pivoted from the position shown in FIG. 2 into a position shown in dashed lines in FIG. 1, in which an upper edge of the rear guide plate 23 rests against a shoulder 32 of the front guide plate 24. Access to the shredding device 17 may be accordingly blocked. As the straw portion 16 slides down along an outer side of the rear guide plate 23 and falls to the ground while bypassing the wide spreading device 27, the straw portion may be deposited behind the combine harvester 1 as a swath. The wide spreading device 27 may also be pivoted downward in this state, as shown in dashed lines in FIG. 1, to facilitate the sliding of the straw portion along a flat upper side 33 of the wide spreading device 27.

Figure 3:
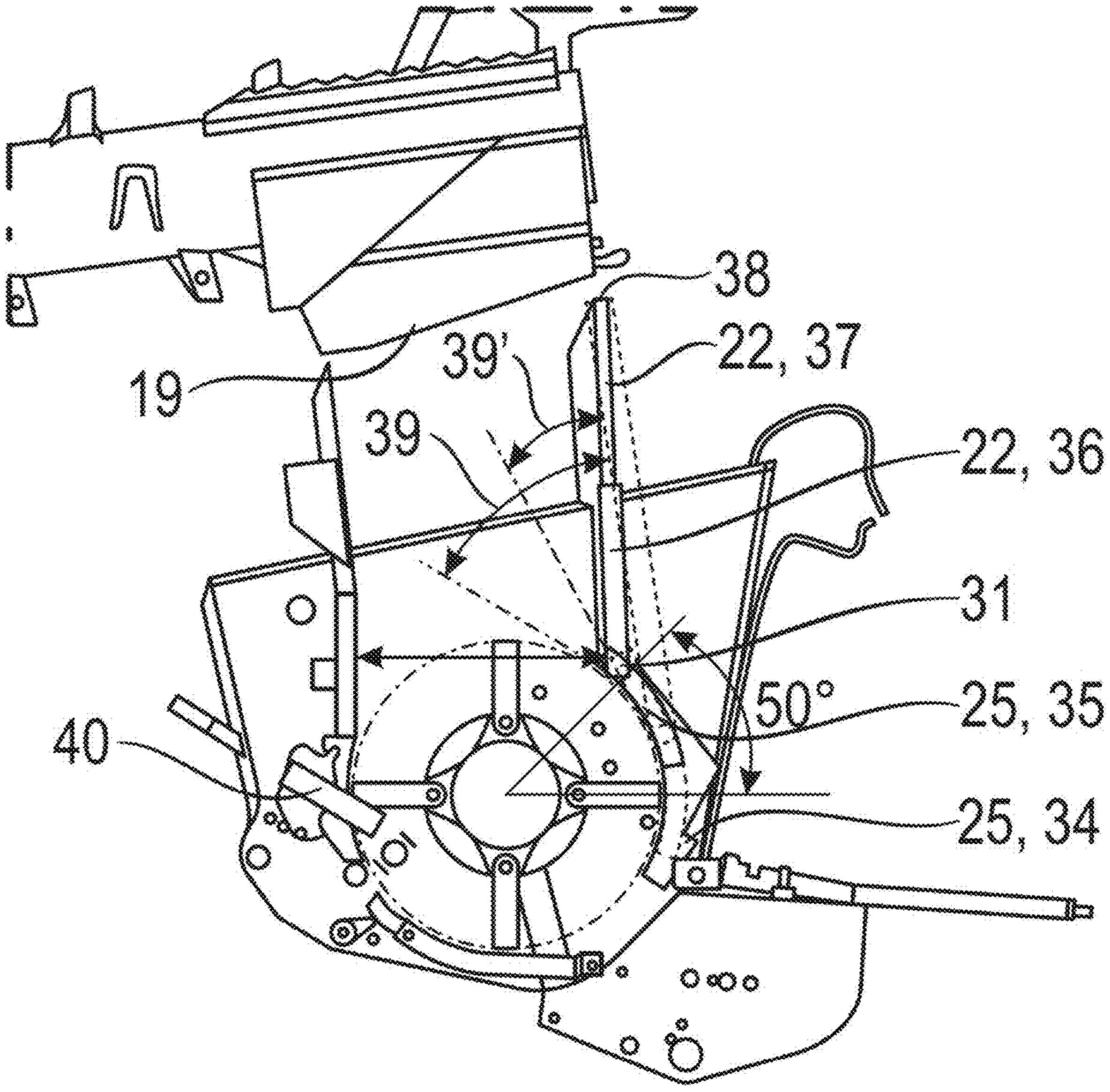
FIG. 3 illustrates an alternative embodiment of the shredding device.
Figure 4:
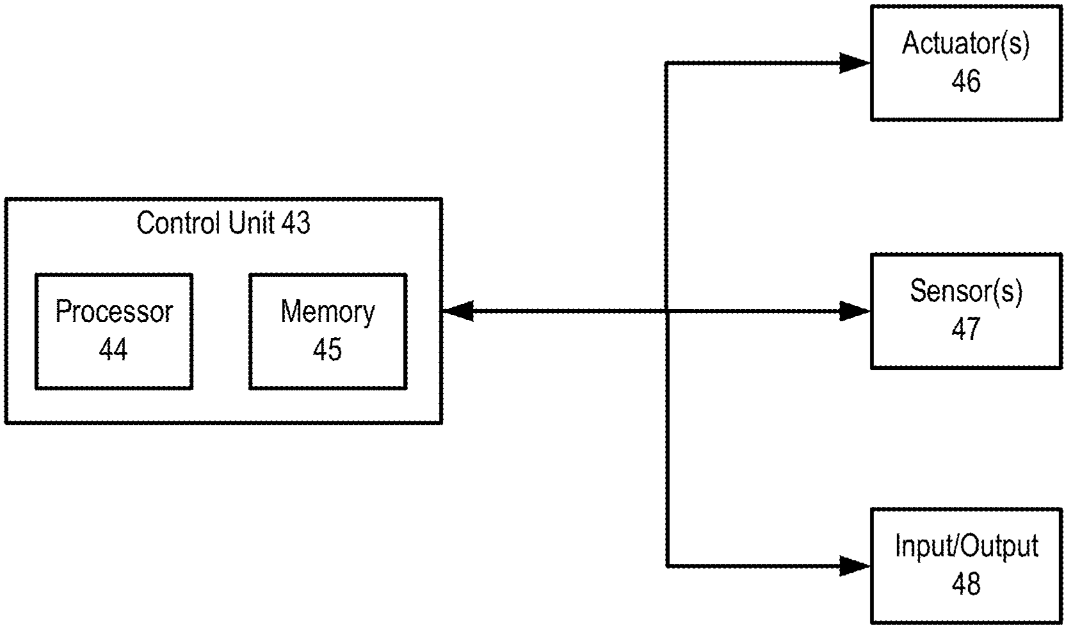
FIG. 4 illustrates a block diagram.

As shown in FIG. 3, the housing section 25 comprises a stationary segment 34 and a segment 35 forming the upper edge 31 and displaceable against the segment 34 in the circumferential direction of the chopping rotor 2 using one or more actuators 46, as shown in FIG. 4 (e.g., control unit 43 may transmit, such as wired and/or wirelessly, to actuator (s) 46 one or more commands in order to mechanically configure the shredding device with any configuration as discussed herein), and the rear guide plate 23 comprises segments 36, 37 telescopically displaceable relative to one another, of which the lower segment 36 is articulated or connected to the upper edge 31 of the segment 35 and the upper segment 37 to the separating device 14. In this way, the rear guide plate 23 may become shorter or longer (e.g., via the control unit 43 actuating actuator(s) 46) to match an increase or decrease in the extension of the housing section 25 and, in the process, pivot about an axis 38 which connects it to the outlet area 19. The rear guide plate 23 may accordingly be adjustable between a position shown in FIG. 3 drawn with solid lines in which a gusset 39 between the guide plate and the circle 21 is flat and wide open, and the airflow driven by the rotation of the chopping rotor 2 has a strong forward velocity component that deflects the straw portion forward, and a position drawn in dashed lines in which the cross-section of the channel 22 is large, but in return the gusset 39' is deep and narrow, and the airflow has a substantially upward velocity component that keeps straw particles in the gusset 39' floating but barely deflects them forward.

In order to set an optimum compromise between a cross-section of the channel 22, which may be as large as possible in favor of an unobstructed material flow and the desire to avoid clumping of the straw portion at the gusset, a control unit 43 may be configured to set actuator(s) 46 depending on an automatically identified and/or user-entered of any one, any combination, or all of: type or variety of harvested material; a mass flow of one of the various flow of above-described harvested materials measured at any suitable point in the combine harvester; the moisture content of the harvested material; etc. In one or some embodiments, the control unit 43 may be configured to receive input from one or more sensor(s) 47 in order to determine any one, any combination, or all of: type or variety of harvested material; a mass flow of one of the various flow of above-described harvested materials measured at any suitable point in the combine harvester; or the moisture content of the harvested material. Alternatively, or in addition, the control unit 43 may be configured to receive input from a user via input/output 48 (such as a touchscreen display) in order to determine any one, any combination, or all of: type or variety of harvested material; a mass flow of one of the various flow of above-described harvested materials measured at any suitable point in the combine harvester; or the moisture content of the harvested material. In either instance, the control unit 43 may execute software stored in memory 45 in order to: (i) automatically determine the mechanical configuration of the shredding device in order to set an optimum compromise between a cross-section of the channel 22 and the desire to avoid clumping of the straw portion at the gusset (e.g., to determine the mechanical setting of the rear guide plate 23); and (ii) automatically control the actuator(s) 46 in order to automatically configure the shredding device to the determined mechanical configuration.

Various types of computing functionality are contemplated, such as control unit 43. The control unit 43 may comprise at least one processor 44 and at least one memory 45 that stores information and/or software, with the processor 44 configured to execute the software stored in the memory 45. In this regard, the control unit 43 may comprise any type of computing functionality, such as the at least one processor 44 (which may comprise a microprocessor, controller, PLA, or the like) and the at least one memory 45. The memory 45 may comprise any type of storage device (e.g., any type of memory). Though the processor 44 and the memory 45 are depicted as separate elements, they may be part of a single machine, which includes a microprocessor (or other type of controller) and a memory. Alternatively, the processor 44 may rely on memory 45 for all of its memory needs.

The processor 44 and memory 45 are merely one example of a computational configuration. Other types of computational configurations are contemplated. For example, all or parts of the implementations may be circuitry that includes a type of controller, including an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Further, it is intended that the foregoing detailed description be understood as an illustration of selected forms that the invention may take and not as a definition of the invention. It is only the following claims, including all equivalents, that are intended to define the scope of the claimed invention. Further, it should be noted that any aspect of any of the preferred embodiments described herein may be used alone or in combination with one another. Finally, persons skilled in the art will readily recognize that in preferred implementation, some, or all of the steps in the disclosed method are performed using a computer so that the methodology is computer implemented. In such cases, the resulting physical properties model may be downloaded or saved to computer storage.

LIST OF REFERENCE NUMBERS

1 Combine harvester
2 Chopping rotor
3 Inclined conveyor
4 Harvested material flow
5 Tangential threshing unit
6 Intermediate flow of harvested material
7 Cleaning device
8 Grain portion (flow of harvested material)
9 Chaff portion (flow of harvested material)
10 Intermediate flow of harvested material
11 Threshing unit
12 Threshing unit
13 Axial flow rotor
14 Separating device
15 Partial stream
16 Straw portion (flow of harvested material)
17 Shredding device
18 Axis
19 Outlet area
Chopping blade
21 Circle
22 Channel
23 Rear guide plate
24 Front guide plate
Housing section
26 Housing section
27 Wide distribution device
28 Segment
29 vertical section
Output
31 Upper edge
32 Shoulder
33 Upper side
34 Segment
Segment
36 Segment
37 Segment
38 Axis
39 Gusset
Opposing blade
41 Line
42 Air flow
43 Control unit
44 Processor
45 Memory
46 Actuator
47 Sensor
48 Input/Output

The invention claimed is:

1. A combine harvester comprising:

a separating device configured to separate grain and straw;

a shredding device downstream from the separating device and configured to shred at least a portion of the straw discharged by the separating device, the shredding device comprises a chopping rotor which is driven in rotation about an axis oriented transversely to an infeed direction of the portion of straw into the shredding device, rotary movement of the chopping rotor configured to generate an air flow directed away from the chopping rotor, wherein the rotary movement is opposite the infeed direction on at least a part of circumference of the chopping rotor; and at least one mechanical structure configured to regulate the infeed direction of the straw portion into the shredding device so that the air flow does not counteract an infeed of the straw portion into the shredding device; and wherein the at least one mechanical structure configured to regulate the infeed direction of the straw portion into the shredding device comprises an adjustable crop guide plate that borders a channel running substantially vertically from the separating device to the shredding device on one side.

2. The combine harvester of claim 1, wherein the adjustable crop guide plate borders the channel running from the separating device to the shredding device on a rear side with respect to direction of travel of the combine harvester.

3. The combine harvester of claim 1, further comprising a control unit configured to adjust a position of the adjustable crop guide plate.

4. The combine harvester of claim 3, wherein the control unit is configured to regulate the position of the adjustable crop guide plate based on one or more of a nature of chopped material, rotational speed of the chopping rotor, an operating speed of the separating device or a mass flow.

5. The combine harvester of claim 3, wherein the control unit is configured to regulate the position of the adjustable crop guide plate based each of a nature of chopped material, rotational speed of the chopping rotor, an operating speed of the separating device or a mass flow.

6. The combine harvester of claim 3, wherein the control unit is configured to automatically adjust the position of the adjustable crop guide plate without input from a user of the combine harvester.

7. The combine harvester of claim 3, wherein the control unit is configured to automatically adjust the position of the adjustable crop guide plate based on input from a user of the combine harvester.

8. The combine harvester of claim 1, wherein the adjustable crop guide plate is configured to pivot about an axis parallel to an axis of the chopping rotor.

9. The combine harvester of claim 1, wherein the adjustable crop guide plate is configured to regulate the infeed direction; and wherein the adjustable crop guide plate is rigidly positioned at least during an operation of the shredding device and borders a channel running from the separating device to the shredding device on at least one side.

10. The combine harvester of claim 9, wherein the adjustable crop guide plate borders the channel running from the separating device to the shredding device on a rear side with respect to a direction of travel of the combine harvester.

11. The combine harvester according to claim 9, wherein the channel is bordered on a second side by another guide plate.

12. The combine harvester of claim 11, wherein a distance between the adjustable crop guide plate and the another guide plate is at least temporarily smaller than a diameter of the chopping rotor.

13. The combine harvester of claim 11, wherein the distance between the adjustable crop guide plate and the another guide plate is at least temporarily smaller by at least 20% than the diameter of the chopping rotor.

14. The combine harvester of claim 1, wherein the adjustable crop guide plate extends over at least a part of a length of the chopping rotor.

15. The combine harvester of claim 14, wherein the adjustable crop guide plate extends over an entire length of the chopping rotor.

16. The combine harvester of claim 1, wherein the adjustable crop guide plate adjoins a housing section of the shredding device concentric to an axis of the chopping rotor.

17. The combine harvester of claim 16, wherein the housing section has an inclination of 30° to 70° with respect to a vertical at its edge adjacent to the adjustable crop guide plate.

18. The combine harvester of claim 16, wherein the housing section has an inclination of 40° to 60° with respect to a vertical at its edge adjacent to the adjustable crop guide plate.

19. The combine harvester of claim 1, further comprising a wide spreading device configured to spread chopped material transversely to a direction of travel;

wherein the wide spreading device is downstream from the shredding device; and wherein the separating device is configured to separate a chaff portion in addition to the straw portion and a grain portion, and to feed the chaff portion to the wide spreading device while bypassing the shredding device.

20. The combine harvester of claim 2, wherein the channel running substantially vertically from the separating device to the shredding device is configured to move the straw portion towards the shredding device so that the straw portion is driven by its own weight into the shredding device.

* * * * *